United States Patent [19]

Davis et al.

[11] 4,258,770

[45] Mar. 31, 1981

[54] CURED RUBBER SKIM STOCK COMPOSITIONS HAVING IMPROVED METAL ADHESION AND METAL ADHESION RETENTION

[75] Inventors: James A. Davis, Uniontown; Jung W. Kang, Clinton, both of Ohio

[73] Assignee: The Firestone Tire & Rubber Company, Akron, Ohio

[21] Appl. No.: 68,824

[22] Filed: Aug. 22, 1979

[51] Int. Cl.$^3$ ............................................. B60C 9/16
[52] U.S. Cl. ..................... 152/330 R; 152/357 R; 152/374; 156/124; 156/335; 260/25
[58] Field of Search ............... 152/330 R, 357 R, 374; 156/110 A, 124 R, 306, 309, 335; 260/25, 23.7 M, 23.7 R, 27 BB

[56] References Cited

U.S. PATENT DOCUMENTS

| | | | |
|---|---|---|---|
| 2,240,805 | 5/1941 | Semon | 156/309 |
| 2,912,355 | 11/1959 | Formanek et al. | 156/306 |
| 3,897,583 | 7/1975 | Bellamy | 156/306 |
| 3,936,536 | 2/1976 | Brock | 427/229 |
| 4,148,769 | 4/1979 | Swarts et al. | 260/25 |

OTHER PUBLICATIONS

Hercules Product Data #7135-11, pp. 1-3, Wilmington, Delaware.
Hercules Technical Data Bulletin OR-247, pp. 1-2, Wilmington, Delaware.
Hercules Toxicological Data Bulletin T-115, Wilmington, Delaware.
Hercules "Vinsol Resin Properties and Uses," pp. 1-20, Wilmington, Delaware.

Primary Examiner—John E. Kittle

[57] ABSTRACT

Disclosed is a composition for the improvement of the adhesion and adhesion retention between conventional rubber skim stock compositions, utilized in the manufacture of tires, conveyor belts, hoses and the like, and metallic reinforcement cords such as brassed steel. The invention composition is prepared by incorporating an inorganic salt of cobalt or nickel and a rosin-derived resin into the rubber stock prior to contacting the metallic reinforcement. Tests conducted with brass-plated and zinc-plated steel cords showed improved metal adhesion and metal adhesion retention with use of the rubber skim stock of this invention when compared to existing formulations.

8 Claims, No Drawings the adhesive properties of the treated rubber composition, although the cobalt oxide sample exhibited nearly twice the adhesion of the control rubber composition containing no cobalt compound. The patent also states that rosins and resins are among known rubber compounding ingredients, however, there is no recognition or indication that adhesion between rubber and metallic reinforcements could be improved with any of these ingredients.

U.S. Pat. No. 3,897,583 is directed toward the adhesion of metal to rubber by incorporating an organo-cobalt salt in a rubber stock which contains an adhesive resin forming system based on a methylene donor which is a methylolated nitroalkane in combination with a resorcinol type methylene acceptor. Cobalt salts disclosed include those of aliphatic or alicyclic carboxylic acids having 6–30 carbon atoms.

U.S. Pat. No. 3,936,536 discloses the method of adhering rubber to metal by coating the metal with rubber containing a small amount of $Co(NH_3)_2.Cl_2$.

U.S. Pat. No. 4,148,769 is directed toward a sulfur-containing rubber composition having an improved adhesion with brass-plated steel cords comprising, as unconventional ingredients, litharge and a cobalt salt of a fatty acid. The patentees further state their belief that adhesive strength is improved by the addition of a phenolic resin such as resorcinol, or a prereacted soluble resorcinol resin. Resorcinol resin has long been known to increase the adhesion between rubber and brass. The data in the patent indicates that even more satisfactory results obtain when the cobalt salt and litharge are incorporated together in the rubber composition.

Thus, while others have sought to enhance adhesion between rubber compositions and metals by employing phenolic resins and certain cobalt compounds, particularly organic salts thereof, the combined effect of certain rosin-derived resins with inorganic salts of cobalt as additives to unvulcanized rubber compositions to improve adhesion with metals has not been described in any patents or publications of which we are aware.

CURED RUBBER SKIM STOCK COMPOSITIONS HAVING IMPROVED METAL ADHESION AND METAL ADHESION RETENTION

TECHNICAL FIELD

The present invention is directed to improvement in the adhesion and adhesion retention between a rubber skim stock composition, used in the manufacture of tires, conveyor belts, hoses and the like, and metallic reinforcement cord such as steel wire and cable which commonly carries a protective coating of zinc or brass.

In the manufacture of the foregoing rubber articles, particularly steel-belted bias and radial tires, it has become common to reinforce the rubber skim stock material with steel wire or cable. The metallic reinforced rubber is employed as a belt, one or more of which is circumferentially oriented beneath the tread stock to maintain the integrity and shape of the tire during inflation and subsequent load. In order for the belt to function effectively, it is imperative that adhesion between the rubber and the steel cord be effectively maintained. Because steel is prone to oxidation, which even in minor degree is highly deleterious to the necessary adhesion with the rubber skim stock, and it would be most impractical to incorporate a chemically clean, oxidation-free steel cord in the belt at the time of its manufacture, the steel cord is plated with zinc or brass thereby protecting it from oxidation until it can be used.

While adhesion between zinc or brass-plated steel cord and rubber is generally far greater than that between the latter and oxidized steel, existing data determined from article life as well as modern testing techniques indicates that adhesion obtained between plated steel cord and the elastomer must be increased for improved article life and service. Adhesion must also be improved between the rubber skim stock and bright steel, i.e., surfaces of the cord which are neither plated nor oxidized, generally occurring when the steel cords and rubber skim stock are cut to size from larger, calendered sheets of the reinforced rubber stock.

BACKGROUND ART

In order to promote adhesion between rubber and ferrous metals it is known to employ a variety of organometallic salts as coatings to the metal or as an ingredient in a rubber composition. One early patent embodying the former technique is U.S. Pat. No. 2,240,805 which discloses that rubber stock adheres more readily to a variety of metals including brass after they have been plated with pure or alloyed cobalt. The invention requires the coating of the metal with cobalt, rather than adding cobalt or an inorganic salt thereof to the rubber stock.

Addition of an organo-cobalt compound to a rubber compound is disclosed by U.S. Pat. No. 2,912,355 wherein 0.1% to 10% by weight of a partially calcined organo-cobalt compound, based on the weight of rubber is incorporated into a vulcanizable rubber composition to increase the adhesion of the rubber, when vulcanized, to contacted metal surfaces, preferably copper, zinc, or their alloys, among others. The cobalt compounds recited by the patentees are primarily cobalt salts of organic acids, preferably aliphatic fatty acids, which are heated under oxidizing conditions prior to incorporation into the rubber composition. The patent discloses that total oxidation of the organo-cobalt compound to cobalt oxide results in over a fifty percent drop in

DISCLOSURE OF THE INVENTION

It is therefore an object of the present invention to provide a rubber skim stock having improved adhesion and adhesion retention with metallic reinforcement such as steel and brass-plated or zinc-plated steel which can be in the form of, for example, wire or cord.

It is yet another object of the present invention to provide a tire having steel reinforcing elements emb-in the rubber skim stock disclosed herein.

These and other objects, together with advantages thereof over the prior art, which shall become apparent from the specification which follows, are accomplished by our invention as hereinafter described and claimed.

In the practice of the present invention, an inorganic salt of cobalt or nickel is incorporated with a commercially available rosin-derived resin into the rubber skim stock which is subsequently reinforced with metallic cords.

The rubber skim stock composition of our invention exhibits enhanced adhesion and adhesion retention with metallic reinforcement such as brass-plated steel cord, and comprises a vulcanizable rubber skim stock having from about 0.05 to about 10.0 phr of an inorganic cobalt or nickel salt with about 2 to about 10 phr of a rosin-derived resin. Both additives are present in parts per hundred parts of rubber (phr) based upon the weight of the elastomer in the rubber skim stock.

PREFERRED MODE FOR CARRYING OUT THE INVENTION

To illustrate our invention a rubber skim stock is presented hereinbelow which is suitable for preparation of rubber articles such as tires. Adhesion between this stock with steel reinforcement subsequent to vulcanization has been measured and is also presented hereinbelow. It is to be understood that the composition of the rubber skim stock provided is not part of the present invention and that it has been presented solely to enable those skilled in the art to have at least one rubber skim stock with which to practice the invention.

The ingredients utilized in the practice of the present invention include an inorganic salt of cobalt or nickel and a rosin-derived resin. We have found cobalt hydrate to be particularly useful and it can be employed in amounts of from about 0.05 to about 10.0 phr. The composition of the cobalt hydrate (hydroxide) powder which we have employed is 61.25% cobalt, 34.42% oxygen, 2.17% hydrogen and 2.16% inorganic material (traces of inorganic metals, sulfates, phosphates, acid insolubles, etc.). Cobalt hydrate itself has a formula weight of 92.956 and is free of any chemically bound water. Cobalt hydrate having this composition can be obtained from the Shepherd Chemical Company, Cincinnati, Ohio. Other cobalt or nickel salts such as the chlorides, nitrates and nickel hydrate can be employed in substantially the same amounts.

With respect to the rosin-derived resin, we have found a Hercules product, Vinsol to be particularly effective with cobalt hydrate in promoting adhesion between rubber skim stocks containing these additives and metal. Vinsol, an extractable material from pine wood is a registered trademark of Hercules, Inc.

According to information supplied by Hercules, Vinsol is taken from aliphatic hydrocarbon-insoluble solids of pine wood extract and is a complex mixture of many components. It contains acidic materials derived from resin acids and oxidized resin acids as well as high molecular weight neutral compounds such as polymerized terpenes and natural waxes. Over one-half of Vinsol is comprised of constituents which are phenolic in character, particularly phlobaphenes, giving it its dark color. Approximately one-fourth of Vinsol consists of resin acids having carboxyl groups and, in addition to the carboxyl and phenolic hydroxyl groups, there are other reactive groups containing double bonds and active hydrogens.

Among some of Vinsol's chemical properties, also determined by Hercules, are the following: acid number 95; hydroxyl content by acetylation 5.5%; methoxyl content (ASTM) 5.1%; molecular weight (average) 495; and pH of a water-alcohol solution 4.7. Physical properties include: dark-colored, ruby red by transmitted light and dark brown by reflected light; density at 25° C. 1.220; and, softening point (Hercules drop method) 120° C. Further specifics can most likely be obtained directly from Hercules, Inc. For purposes of this disclosure we have referred to this product as a rosin-derived resin. It is to be understood that Vinsol is one such commercially available resin that has been found to be satisfactory; however, we do not specify this resin to the exclusion of others it being our belief that other resin products having similar properties and components could be substituted for Vinsol to improve adhesion of rubber skim stocks and metal. Amounts of the resin we believe would be effective are from about 2.0 to about 6.0 phr.

In order to determine the improvement in adhesion obtained when a cobalt salt and a rosin-derived resin are added to the rubber skim stock, T-adhesion tests (rubber-steel cord) were conducted.

The test utilized T-adhesion pads prepared by placing 60 gauge slabs of uncured fully compounded rubber skim stock on 51 gauge fabric reinforced rubber backing. Commercial brass-coated cables (1×5×0.25 mm diam.) were placed between two pads of the reinforced skim stock with the wires in contact with the uncured rubber skim at 1.25 cm. intervals. The width of each adhesion pad was 1.25 cm. The pads were placed in a mold and were cured for 30 minutes at 149° C. Testing was done on a Model 1130 Instron Universal Tester at a crosshead speed of 25.4 cm. per minute and 110° C. The T-adhesion pads were preheated in the 110° C. oven for 20 minutes prior to testing. Oven aging of the cured T-adhesion pads was done in a forced air oven at 121° C. for two days. Steam bomb aging of the cured samples was done in a pressure tight bomb for one hour at 149° C., in a saturated steam atmosphere.

Detailed T-adhesion Test Procedure

1. Using a Clicker machine and a 15.24×1.25 cm. die, prepare an adequate number of calendered and control stock samples for T-adhesion pad building.
2. Use one piece of calendered fabric reinforced rubber backing (0.1295 cm.).
3. Ply one piece of control rubber stock (0.1524 cm.) onto the fabric backing.
4. Place sample in building jig with fabric side down.
5. Place ten cords (of brass or zinc coated wire) approximately 17.78 cm. in length equally spaced on top of the two piece assembly.
6. Invert another 2 ply assembly, made as in items 1, 2 and 3, on top of cords so that cords are between the two layers of rubber skim stock to be tested.
7. This assembly should now fit snugly into the curing mold.
8. Adhesion pads shall be cured for 30 minutes at 149° C. and then allowed to equilibrate for 24 hours.
9. Testing Machine: Model 1130 Instron Universal Tester.
10. Test speed 25.4 cm./minute; testing temperature, 110° C. after 20 minutes preheat.
11. The top grip shall be of a special holder made for the cured sample, with a slot in the bottom to permit the sample to be inserted with the wire protruding. The bottom grip should be a wedge type, designed to exert increasing tightening as each wire is pulled from the cured sample.
12. Record 10 wire pull-outs and average. Multiply average pull-out force value by 0.3572 to obtain kilograms per centimeter.

In the tests which follow a rubber skim stock, Stock A, was prepared to which cobalt hydrate and/or the rosin-derived resin were added in varying amounts. Formulations for each are as follows with all parts given on the basis of per hundred parts of rubber (phr) by weight according to the weight of the rubber, unless otherwise specified.

| Compounding Ingredients | Stock A |
| --- | --- |
| Natural Rubber | 100 |

-continued

| Compounding Ingredients | Stock A |
|---|---|
| HAF carbon black | 50 |
| Zinc Oxide | 7.5 |
| Stearic acid | 0.38 |
| Process Oil | 4.0 |
| Santoflex 13 *1 | 1.0 |
| Santoflex DD *2 | 2.0 |
| NOBS SPECIAL *3 | 0.6 |
| Sulfur MB *4 | 3.5 |
| Santogard PVI *5 | 0.3 |

*1 N-(1,3 dimethylbutyl)-N'-phenyl-p-phenylenediamine
*2 6-dodecyl-1,2-dihydro-2,2,4-trimethylquinoline
*3 N-Oxydiethylene benzothiazole-2-sulfenamide
*4 80% Insoluble sulfur and 20% process oil
*5 N-(cyclohexylthiol)phthalimide amounts of 2 phr (Example 5); 4 phr (Example 6); and, 6 phr (Example 7).

Four sets of tests were conducted for Examples 1–7 and these are reported in Table I. The tests included T-adhesion determination for vulcanized specimens—unaged or unconditioned, Test A; oven aged, Test B; steam bomb aged, Test C; and, humidity chamber aged, Test D. The force necessary to pull or remove the metallic reinforcement from the vulcanized rubber skim stock is given first, in Kg./cm., followed by the percent of rubber skim stock remaining on the surface of the metallic reinforcement. The amount of rubber skim stock remaining on the metallic reinforcement is determined by visual examination and is reported as % rubber coverage.

TABLE I

| Effects of Different Levels and Combinations of Cobalt Hydrate and Vinsol Resin in Stock A | | | | | | | |
|---|---|---|---|---|---|---|---|
| | Example 1 | Example 2 | Example 3 | Example 4 | Example 5 | Example 6 | Example 7 |
| Hexamethylenetetramine, phr | — | 2.32 | — | — | — | — | — |
| Resorcinol, phr | — | 2.0 | — | — | — | — | — |
| Cobalt hydroxide, phr | — | — | .7 | — | .7 | .7 | .7 |
| Vinsol Resin, phr | — | — | — | 4.0 | 2.0 | 4.0 | 6.0 |
| Test A | | | | | | | |
| Unaged or Unconditioned Plated Steel Cord[a] | | | | | | | |
| Brass-plated | | | | | | | |
| Kg./cm. | 28.93 | 29.65 | 30.72 | 20.36 | 29.65 | 29.65 | 31.61 |
| % rubber coverage | 90 | 100 | 95 | 80 | 100 | 100 | 95 |
| Zinc-plated | | | | | | | |
| Kg./cm. | 3.04 | 4.64 | 8.75 | 3.2 | 4.29 | 6.43 | 15.54 |
| % rubber coverage | 0 | 0 | 10 | 0 | 0 | 0 | 70 |
| Test B | | | | | | | |
| Oven Aged Plated Steel Cord[b] | | | | | | | |
| Brass-plated | | | | | | | |
| Kg./cm. | 7.68 | 12.84 | 22.52 | 14.25 | 23.27 | 23.13 | 23.06 |
| % rubber coverage | 60 | 35 | 95–100 | 70 | 90–95 | 90–95 | 90–95 |
| Zinc-plated | | | | | | | |
| Kg./cm. | 1.61 | 1.07 | 5.50 | 5.50 | 3.27 | 5.59 | 13.86 |
| % rubber coverage | 0 | 0 | 5 | 0 | 0 | 5 | 55–60 |
| Test C | | | | | | | |
| Steam Bomb Aged Plated Steel Cord[c] | | | | | | | |
| Brass-plated | | | | | | | |
| Kg./cm. | 20.9 | 18.24 | 17.48 | 20.65 | 16.20 | 17.29 | 21.18 |
| % rubber coverage | 40 | 60 | 75–80 | 75 | 65–70 | 70–75 | 80 |
| Zinc-plated | | | | | | | |
| Kg./cm. | 1.79 | 0.89 | 15.27 | 0.89 | 8.11 | 12.45 | 11.68 |
| % rubber coverage | 0 | 0 | 35–40 | 0 | 5 | 20 | 15 |
| Test D | | | | | | | |
| 30 Day Humidity Chamber Test[d] | | | | | | | |
| Brass-plated | | | | | | | |
| Kg./cm. | — | 28.29 | 21.61 | 27.68 | 26.43 | 29.83 | 28.40 |
| % rubber coverage | — | 5–10 | 65–70 | 10–15 | 75–80 | 80–85 | 80–85 |

[a]T-adhesion pads cured 30 minutes at 149° C., and tested at 110° C.
[b]T-adhesion pads cured 30 minutes at 149° C., heat aged in a forced air oven for 2 days at 121° C. and tested at 110° C.
[c]T-adhesion pads cured 30 minutes at 149° C., steam bomb aged 1 hour at 149° C. and tested at 110° C.
[d]T-adhesion pads cured 30 minutes at 149° C., aged in humidity chamber for 30 days at 90% relative humidity and 35° C.

In the Tests which follow, a control (Example 1) was prepared wherein neither cobalt hydrate nor resin was added to Stock A. Example 2 represents a second control-type experiment wherein neither additive of the present invention was employed although other ingredients, known to aid adhesion but not a part of the present invention, were present. Cobalt hydrate was added to Stock A in amounts of 0.7 phr alone (Example 3 and with the resin Examples 5–7). The rosin-derived resin was added alone to Stock A in an amount of 4 phr (Example 4) and in combination with cobalt hydrate in As can be seen from Table I, Test A, adhesion to brass-plated steel cord was better in Examples 1–7, wherein the Stock A T-adhesion pads were applied to brass-plated steel cords rather than zinc-plated steel cord. In Test A, Examples 5–7, which Examples contained both components of the present invention, gave adhesion as good as or better than Example 2, which contained known adhesion promoters. Examples 3 and 4 are interesting as each demonstrates the effect of adding only one of the components of the present invention. Percent rubber coverage can be seen to be improved significantly by the addition of one or both components. The zinc-plated steel cord results are comparable by effect, but not numerical value, with Example 7 showing superior results over any of the preceding six.

In Test B, the presence of the resin and cobalt hydrate improved adhesion in both brass-plated and zinc-plated steel cord reinforced specimens over the controls, Examples 1 and 2. The oven aging test is an accelerated heat aging test and is significant in determining the effect of heat on the thermal stability of the chemical bonds formed between the rubber skim stock and the metallic reinforcement during vulcanization. In Test C, Example 7 showed the most improved results with brass-plated steel cord and Example 6 showed the most improved results with zinc-plated steel cord where both ingredients were present; Example 3 being the best with only cobalt hydrate. Steam bomb aging for one hour at 149° C., is an accelerated humidity aging test and is significant in determining the chemical stability of the chemical bonds formed between the rubber skim stock and the metallic reinforcement when exposed to moisture or steam under pressure.

Lastly, Test D which represents 30 day humidity chamber testing shows that adhesion was generally not deleteriously effected by the humidity in those stocks containing both ingredients of the present invention. Example 1 was not subjected to this test inasmuch as it was not expected to perform well. Similarly, tests were not conducted with zinc-plated steel cord, inasmuch as a trend had already been noted that better results were being obtained with the brass-plated steel cord. Longer term tests were also conducted, wherein it was established that substantially no change in adhesion or percent rubber coverage occured between 30 and 60 days of exposure in the humidity chamber. Significance of the humidity chamber tests is again in determining the chemical stability of chemical bonds formed between the rubber skim stock and the metallic reinforcement when exposed to conditions of high relative humidity and high temperature, as compared to ambient, and extended periods of time.

Based on the foregoing results, we consider the incorporation of cobalt hydrate or other inorganic salts of cobalt or nickel with a rosin-derived resin into a rubber skim stock to be an effective adhesion promoter.

As stated hereinabove, the wire coated in the practice of our invention can be, for example, brass-plated wire, i.e., 70% Cu, 30% Zn; zinc-plated or bright steel. The wire can be in the form of a strand, mat, web, ply or braid.

The present invention also finds utility in, for example, brassed metal-rubber articles such as motor mounts, cutless bearings, torsilastic springs, power belts, printing rolls, metal wire reinforced or braided hose, electrical deicers, shoe heels and wherever it is desired to secure rubber to metal or provide a flexible and strong, thermally stable bond between the same.

Thus, it can be seen that the disclosed invention carries out the objects set forth hereinabove. As will be apparent to those skilled in the art, the composition of the rubber skim stock can be varied within the scope of our total specification disclosure by the selection of the various ingredients as well as the amounts thereof, and it is believed that the preparation and use of these according to the preferred method of the invention can be determined without departing from the spirit of the invention herein disclosed and described, the scope of the invention being limited solely by the scope of the attached claims.

We claim:

1. Cured rubber skim stock compositions having improved metal adhesion and metal adhesion retention properties, said composition comprising:
   100 parts of a vulcanizable rubber stock;
   from about 2.0 to about 10.0 parts by weight of a resin comprising resin acids containing carboxylic acid groups and derived from crude wood rosin, per 100 parts of the rubber component in said rubber stock; and,
   from about 0.05 to about 10.0 parts by weight of an inorganic cobalt salt, per 100 parts of the rubber component in said rubber skim stock.

2. Cured rubber skim stock composition as set forth in claim 1, wherein said inorganic cobalt salt is cobalt hydrate.

3. Cured rubber skim stock compositions, as set forth in claims 1 or 2 wherein said metal is present in a metallic reinforcing cord selected from the group consisting of steel cord, brass-plated steel cord and zinc-plated steel cord.

4. A tire having metallic reinforcing elements embedded in vulcanized rubber skim stock, said skim stock being characterized by having incorporated therein:
   from about 2.0 to about 10.0 parts by weight of a resin comprising resin acids containing carboxylic acid groups and derived from crude wood rosin, per 100 parts of the rubber component in said rubber skim stock; and,
   from about 0.05 to about 10.0 parts by weight of an inorganic cobalt salt, per 100 parts of the rubber component in said rubber skim stock.

5. A tire, as set forth in claim 4, wherein the metallic reinforcing elements are selected from the group consisting of steel cord, brass-plated steel cord and zinc-plated steel cord and wherein said inorganic cobalt salt is cobalt hydrate.

6. Cured rubber skim stock compositions having improved metal adhesion and metal adhesion retention properties, said composition comprising:
   100 parts of a vulcanizable rubber stock;
   from about 2.0 to about 10.0 parts by weight of a thermoplastic resin insoluble in aliphatic hydrocarbons and derived from crude wood rosin, per 100 parts of the rubber component in said rubber stock; and,
   from about 0.05 to about 10.0 parts by weight of cobalt hydrate, per 100 parts of the rubber component in said rubber skim stock.

7. A tire having metallic reinforcing elements embedded in vulcanized rubber skim stock, said skim stock being characterized by having incorporated therein:
   from about 2.0 to about 10.0 parts by weight of a thermoplastic resin insoluble in aliphatic hydrocarbons and derived from crude wood rosin, per 100 parts of the rubber component in said rubber skim stock; and,
   from about 0.05 to about 10.0 parts by weight of cobalt hydrate, per 100 parts of the rubber component in said rubber skim stock.

8. A tire, as set forth in claim 7, wherein the metallic reinforcing elements are selected from the group consisting of steel cord, brass-plated steel cord and zinc-plated steel cord.

* * * * *